May 23, 1933.  R. F. PEO  1,910,049
SHOCK ABSORBER
Filed March 19, 1930   2 Sheets-Sheet 1

Inventor
Ralph F. Peo.
By Popp & Powers
Attorneys

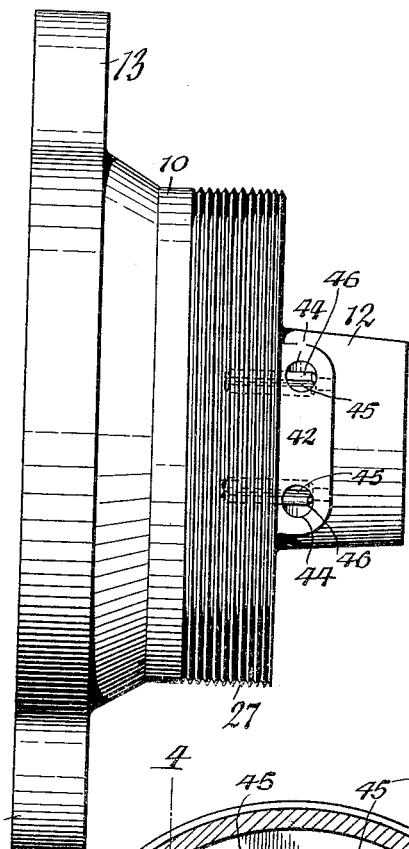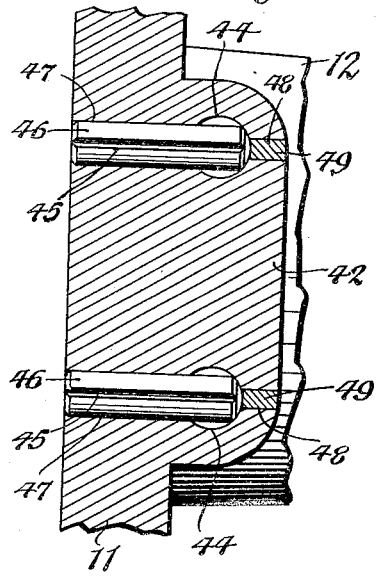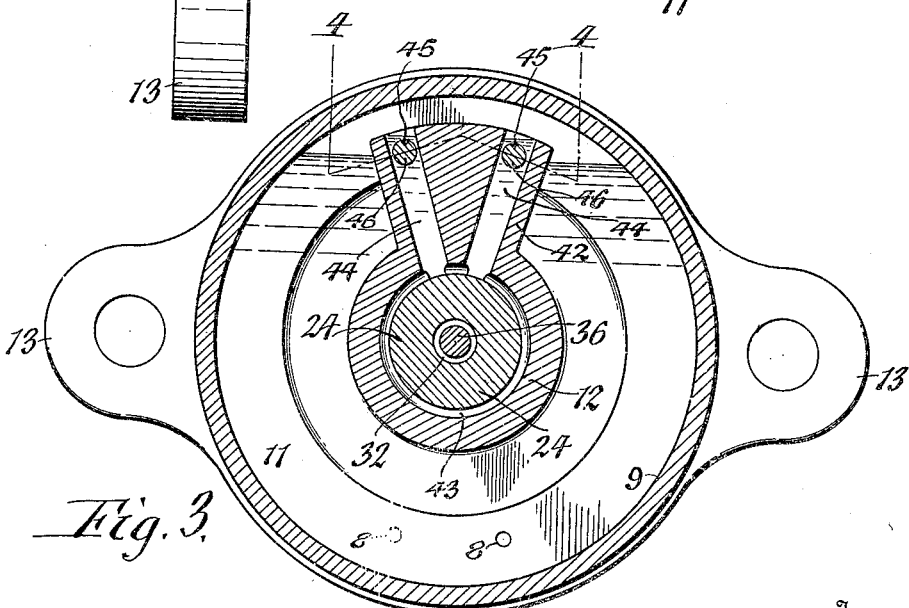

Patented May 23, 1933

1,910,049

UNITED STATES PATENT OFFICE

RALPH F. PEO, OF KENMORE, NEW YORK, ASSIGNOR TO HOUDE ENGINEERING CORPORATION, OF BUFFALO, NEW YORK, A CORPORATION OF NEW YORK

SHOCK ABSORBER

Application filed March 19, 1930. Serial No. 436,992.

This invention relates to a hydraulic shock absorber and more particularly to the type of "Houdaille" shock absorber in which a liquid replenishing chamber is employed in connection with the working chamber so as to supply the latter with liquid when required.

In the forms of this type of shock absorber heretofore known any air mixed with the resistance liquid while in a working chamber was discharged therefrom through a vent leading from the upper part of a working chamber through a partition into the upper part of the replenishing chamber which vent also permitted some of the resistance liquid to flow from the working chamber to the replenishing chamber, which liquid while in the vent operated to seal the same so as to prevent air returning from the replenishing chamber to the working chamber. In this former construction the vent had to be made so small in order to effectively permit escape of air from the working chamber to the replenishing chamber and still cause the liquid to seal the same against return movement of air that this vent was liable to become clogged very easily by small particles of dirt or materials remaining in the working chamber after the shock absorber is made. The vent also had to be made small in order to enable the liquid left therein to seal the same when the level of the liquid in the replenishing chamber dropped below the vent and therefore uncovered the outlet end of the latter.

One of the objects of this invention is to provide means for maintaining a liquid seal in the vent regardless of whether the level of the liquid in the replenishing chamber is high enough to cover the outlet of the vent or so low as to uncover the same and thereby permit of making the vent large so that the same will not become clogged easily.

In the former organizations of this type of shock absorber containing the valve mechanism for regulating the flow of resistance liquid from one side of each piston to the other the closure member was unsupported a considerable distance from its actuating means which was liable to cause imperfect adjustment of this closure relative to the valve seat or face with which it cooperated and thus produce irregular action of the instrument.

Another object of this invention is to so organize the regulating valve mechanism that the closure member is maintained in axial alinement with the valve seat or face and thus insure regular action of the apparatus at all times.

In the accompanying drawings:

Fig. 1 is a vertical longitudinal section of a hydraulic shock absorber embodying my improvements, the section being taken on line 1—1 Fig. 2.

Figs. 2 and 3 are vertical transverse sections taken on line 2—2, and 3—3 Fig. 1, respectively, and looking in the direction of the arrows associated with these figures.

Fig. 4 is a fragmentary horizontal section taken on line 4—4 Fig. 3, on an enlarged scale.

Fig. 5 is a detached plan view of the body of the shock absorber.

Figure 1:
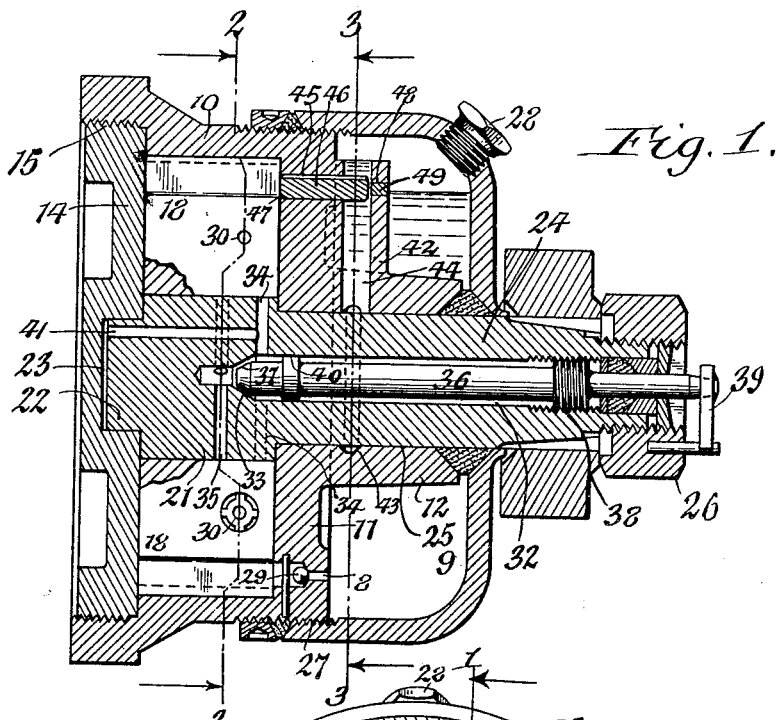

In the following description similar characters of reference indicate like parts in the several figures of the drawings.

The body of this shock absorber in its preferred form comprises a cylindrical wall 10, a flat front wall or partition 11 arranged at the front end of the cylindrical wall, and a tubular neck 12 projecting forwardly from the front wall and arranged axially in line with the cylindrical wall. The cylindrical wall, front wall and neck are formed integrally of metal in any suitable manner. At its opposite sides the cylindrical wall is provided with attaching lugs 13 whereby the same is fastened to the body or frame of the car upon which the shock absorber is to be installed. The rear of the cylindrical wall is provided with a rear flat head 14 which is secured thereto by a screw joint 15 or other suitable means. The space between the front, rear and cylindrical walls is divided into two semi-cylindrical working chambers 16, 17 by two partition sections 18 arranged on diametrically opposite sides of the axis of the body and spaced apart at their inner ends.

Within the working chambers two pistons or wings 19, 20 oscillate, these pistons being connected by a hub 21 which engages its periphery with the inner ends of the partition sections and is provided on its rear end with a short stub shaft 22 journaled in a bearing recess 23 on the rear head 14 and provided on its front end with a forwardly projecting main shaft 24 which is journeled in a bearing 25 formed in the neck on the front wall 11. At its front end this main shaft is provided with a rock arm 26 which is connected in any suitable manner with an adjacent axle or other part of the car which moves relatively to the car frame or body when running over uneven roads.

The working chambers are supplied with a resistance liquid from a replenishing chamber 9 which surrounds the main shaft and the tubular neck containing the bearing for this shaft and is detachably connected with the front end of the cylindrical wall by a screw joint 27. This replenishing chamber is filled with resistance liquid through a filling opening in its top which is normally closed by a plug 28 and this liquid is delivered to lower ends of the working chambers by one or more supply ports 8 in the lower part of the front head 11, each of which is controlled by a check valve 29 opening toward the respective working chamber and closing toward the replenishing chamber.

Figure 2:
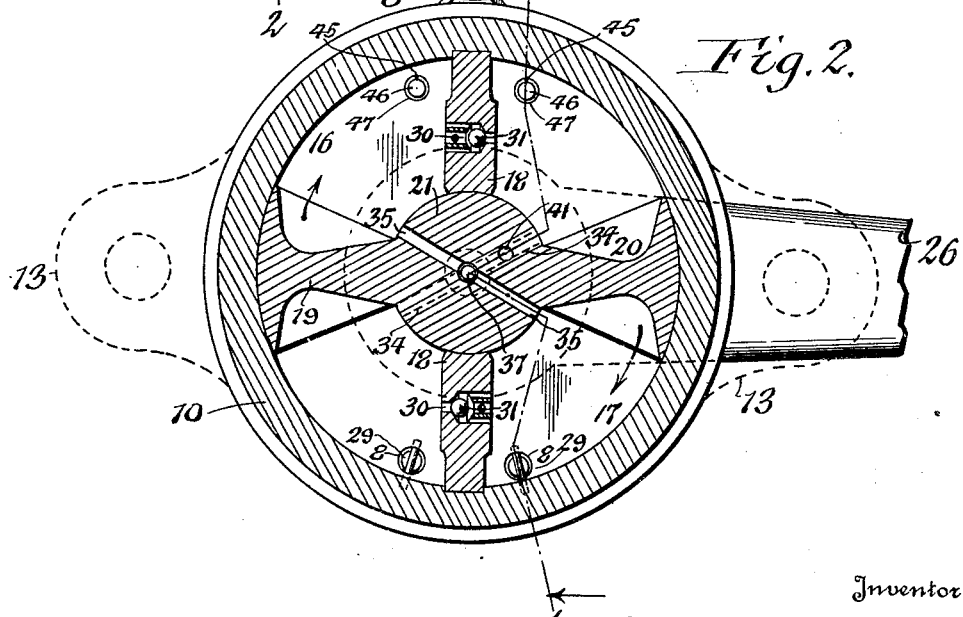

As the pistons move in the direction in which they effect a low compression stroke opposite to the direction indicated by the arrows in Fig. 2, the resistance liquid is permitted to pass through a by-pass port 30 in each partition section 18 from the high compression end of one working chamber to the low pressure end of the other working chamber, which port at this time is opened by a check valve 31, thereby causing the absorber to offer a relatively low resistance to the shock to which the car is subjected during the compression of its springs. When the car body and axle separate or rebound from each other and the pistons move in the opposite direction indicated by the arrows in Fig. 2 each by-pass port 30 is closed by its check valve 31 so that the resistance liquid is trapped in the high pressure end of each working chamber and caused to offer a greater resistance to the shock to which the same is subjected and cushion the same accordingly.

Regulation of the cushioning or shock absorbing effect is obtained by the following means which permit some of the resistance liquid to flow back and forth between the opposite ends of the working chambers.

The numeral 32 represents a longitudinal regulating bore or passage formed axially in the piston hub and main shaft and extending to the front end of the latter. Within the hub this longitudinal passage is provided with a forwardly facing valve seat 33 and in front of this seat front regulating passages 34 lead radially from the bore to the periphery of the hub on the low pressure side of the pistons and in rear of this seat rear regulating passages 35 lead radially from the bore to the periphery of the hub on the high pressure side of the pistons. Within the bore of the hub and main shaft is arranged a longitudinal valve stem 36 which is provided at its rear end with a valve closure 37 movable toward and from the valve seat 33 for regulating the amount of resistance liquid flowing through the regulating passages and thus adjusting the cushioning effect of the shock absorber accordingly.

The longitudinal movement of the valve stem is preferably effected by a screw joint 38 connecting the same with the main shaft so that upon turning the valve stem by means of a handle 39 on the front end thereof, the valve closure will be moved toward and from the valve seat.

To permit the valve stem to move freely in the main shaft this stem is made of smaller diameter throughout the main part of its length than the bore in the main shaft so as to provide a clearance therebetween. In order however to keep the regulating valve closure 37 in axial alinement with the regulating valve seat 33 and properly position said closure relative to said seat to ensure uniform action of the resistance liquid flowing through the regulating passages a guide collar 40 is provided on the valve stem between its ends and preferably adjacent to the valve closure, as shown in Fig. 1, which guide collar engages the bore of the main shaft and maintains the valve closure in a centered position relative to the regulating valve seat and still permit the valve stem to slide and turn freely.

To prevent any liquid from being trapped between the bottom of the bearing recess 23 in the rear head 14 and the rear end of the rear stub shaft 22 a relief passage 41 is provided which extends from the rear end of this shaft to one of the regulating passages, as shown in Fig. 1.

Venting means are provided for discharging from the working chambers any air in the resistance liquid within these chambers, which air is delivered to the replenishing chamber by these venting means but prevented from returning to the working chambers through these venting means. These venting means embody the present improvements and are constructed as follows:

The numeral 42 represents an enlargement on the front side of the front head 11 and extending from the upper side of the tubular neck to within a short distance from the top of this head and the top of the replenishing chamber so as to leave a space therebetween. Vertically in line with this enlargement 42 the bore of the bearing in the neck is provided with an annular liquid intercepting groove 43 which is adapted to receive any liquid which may be pressed by the piston forwardly from the working chambers through the joint between the co-operating bearing surfaces on the periphery of the main shaft and the bore of the neck. In the enlargement 42 are formed two upright liquid collecting chambers or wells 44 each of which extends from the bore of the neck in line with the intercepting groove to the top of the enlargement, said collecting chambers being arranged side by side and respectively in front of the upper part of the working chamber.

The upper part of each working chamber communicates with the upper part of one of said collecting chambers below the upper end of the latter by a vent 45 which latter is preferably constructed in the form of a horizontal groove arranged lengthwise in the periphery of a vent plug 46 seated in an opening 47 extending through the front wall from the upper part of one of the working chambers to the upper part of one of the collecting chambers. Each of these plug openings 47 may be formed by a single boring operating from the rear side of the front wall 11 but if desired a pilot opening of small diameter may be first drilled from the front side of the enlargement 42 rearwardly through the same and through the front wall and then that part of this opening in the front wall may be enlarged to form the full size opening 47 which receives the vent plug 46 while that part 48 of the pilot opening arranged in the enlargement 42 in front of the respective collecting pocket is sealed by a sealing plug 49. The vent plug 46 is preferably made of such length that the same extends from the rear side of the front wall into the respective collecting chamber and abuts against the front part of the wall of the latter, thereby preventing the pressure of the resistance liquid in the respective working chamber against the rear end of the respective vent plug from displacing the same. Each of the vent plugs is narrower than the respective collecting chamber so as to leave a clearance space between the inner side of this collecting chamber and the outer side of the vent plug.

During the operation of the absorber the resistance liquid which is forced forwardly along the main shaft and intercepted by the groove 43 is conducted into the collecting chambers 44 in which this liquid rises until these chambers are filled, after which any excess overflows from the upper end thereof into the replenishing chamber. By this means the rear end of each vent plug is submerged and the vent passage therein is liquid-sealed. As the resistance liquid in the upper part of each working chamber is subjected to pressure by movement of the piston therein the air in the liquid and some of the liquid itself will be forced forwardly through the vent passage in each vent plug from the respective working chamber into the companion collecting chamber and when this air reaches the liquid in this collecting chamber it separates therefrom and rises into the upper part of the replenishing chamber while the liquid passing through the vent passage enters the respective collecting chamber and assists in filling the same if this is necessary or mixed with the liquid therein and overflows therewith into the replenishing chamber in case an excess of liquid enters the respective collecting chamber. Each of the vent passages by this means is always liquid-sealed so as to prevent any air passing backwardly through the same from the replenishing chamber to the respective working chamber and thus causing the shock absorber to work more efficiently due to eliminating air from the resistance liquid.

Moreover by constantly submerging the front end of the vent passages in a body of liquid the same are sealed so effectively that the vent passages can be made larger than heretofore without permitting an undue amount of liquid to escape therethrough from the working chambers, thereby reducing to a minimum the possibility of clogging the vent passages by dirt or small particles of metal which may be left in the instrument in the course of manufacture.

By making the front wall, peripheral wall and tubular neck of the body in one piece and securing a separate rear wall to the rear end of the peripheral wall as parts of the enclosure for the working chambers, the cost of manufacture is reduced and a more substantial support for the moving parts of the shock absorber is provided.

I claim as my invention:

1. A shock absorber comprising a working chamber adapted to contain a resistance liquid, a piston arranged within said working chamber, an oscillating shaft connected with said piston, a liquid replenishing chamber from which liquid is supplied to said working chamber, a partition arranged between said working chamber and replenishing chamber and having a bearing in which said shaft is journaled, a vent passage connecting the upper parts of said working chamber and replenishing chamber, and a collecting chamber extending from said bearing to the front end of said vent and around the latter and adapted to contain a body of liquid extending from said bearing to a point above said vent.

2. A shock absorber comprising a working chamber adapted to contain a resistance liquid, a piston arranged within said working chamber, an oscillating shaft connected with said piston, a liquid replenishing chamber from which liquid is supplied to said working chamber, a partition arranged between said working chamber and replenishing chamber and having a bearing in which said shaft is journaled, a vent passage connecting the upper parts of said working chamber and replenishing chamber, and a collecting chamber extending from said bearing to the front end of said vent, and around the latter, and adapted to contain a body of liquid extending from said bearing to a point above said vent, the wall of said collecting chamber being formed integrally with said partition and bearing.

3. A shock absorber comprising a working chamber adapted to contain a resistance liquid, a piston oscillating in said chamber, an oscillating shaft connected with said piston, a replenishing chamber adapted to supply resistance liquid to said working chamber, a partition arranged between said working chamber and replenishing chamber and provided with a bearing in which said shaft is journaled, an opening extending from the upper part of the working chamber to the upper part of said replenishing chamber and a liquid collecting chamber extending from said bearing to the front end of said opening and surrounding the latter, and a plug arranged in said opening and containing a vent leading from said working chamber to said replenishing chamber.

4. A shock absorber comprising a working chamber having a front wall, a tubular bearing extending forwardly from said wall, a piston oscillating in said working chamber, a main shaft connected with said piston and journaled in said bearing, a liquid replenishing chamber communicating at its lower end with said working chamber, a collecting chamber extending upwardly from said bearing and opening at its upper end into said replenishing chamber, and a vent passage arranged in said wall and extending from the upper part of said working chamber into said collecting chamber at a point below the upper end of the same.

5. A shock absorber comprising a working chamber adapted to contain a resistance liquid, a piston oscillating in said chamber, an oscillating shaft connected with said piston, a replenishing chamber adapted to supply resistance liquid to said working chamber, a partition arranged between said working chamber and replenishing chamber and provided with a bearing in which said shaft is journaled, an opening extending from the upper part of the working chamber to the upper part of said replenishing chamber, and a liquid collecting chamber extending from said bearing to the front end of said opening and surrounding the latter, and a plug arranged in said opening and containing a vent leading from said working chamber to said replenishing chamber, the front end of said plug abutting against the front wall of said collecting chamber.

6. A shock absorber comprising a working chamber adapted to contain a resistance liquid, a piston oscillating in said chamber, an oscillating shaft connected with said piston, a replenishing chamber adapted to supply resistance liquid to said working chamber, a partition arranged between said working chamber and replenishing chamber and provided with a bearing in which said shaft is journaled, an opening extending from the upper part of the working chamber to the upper part of said replenishing chamber, and a liquid collecting chamber extending from said bearing to the front end of said opening and surrounding the latter, and a plug arranged in said opening and containing a vent leading from said working chamber to said replenishing chamber, the front end of said plug abutting against the front wall of said collecting chamber, and said collecting chamber being wider than said plug.

In testimony whereof I affix my signature.

RALPH F. PEO.